United States Patent [19]
Argent et al.

[11] Patent Number: 5,588,978
[45] Date of Patent: Dec. 31, 1996

[54] PROCESS AND APPARATUS FOR COLORING GLASS

[75] Inventors: Ronald D. Argent, Green County, Pa.; James A. Bolin, Tulsa County, Okla.

[73] Assignee: IMTEC, Tulsa, Okla.

[21] Appl. No.: 246,064

[22] Filed: May 19, 1994

Related U.S. Application Data

[63] Continuation-in-part of Ser. No. 981,854, Nov. 24, 1992, abandoned.

[51] Int. Cl.[6] .............................. C03B 5/16; C03B 5/18; C03B 5/24; C03B 7/00
[52] U.S. Cl. .......................... 65/29.1; 65/29.17; 65/66; 65/121; 65/134.3; 65/134.5; 65/135.2; 65/135.3; 65/135.7; 65/135.9; 65/145; 65/158; 65/163; 65/178; 65/335; 65/342; 65/347; 65/356; 65/374.13; 373/27
[58] Field of Search .................................. 65/29.1, 29.11, 65/29.17, 66, 121, 134.3, 134.5, 135.2, 135.3, 135.4, 135.7, 135.6, 135.9, 145, 158, 163, 164, 178, 335, 346, 347, 342, 355, 356, 374.13, DIG. 13; 373/27

[56] References Cited

U.S. PATENT DOCUMENTS

| | | | |
|---|---|---|---|
| 1,791,635 | 2/1931 | Peiler | 65/178 |
| 2,115,408 | 4/1938 | Brosse | 65/146 |
| 2,371,213 | 3/1945 | Batchell | 65/335 |
| 2,512,761 | 6/1950 | Arbeit | 13/6 |
| 2,817,141 | 12/1957 | Toulmin, Jr. | 29/196.6 |

(List continued on next page.)

FOREIGN PATENT DOCUMENTS

| | | | |
|---|---|---|---|
| 1964852 | 7/1971 | Germany | 65/134 |
| 692442 | 6/1953 | United Kingdom | 65/134 |

OTHER PUBLICATIONS

*Features of Molten Glass Motion in Melting Tanks of Furnaces With Different Configuration of the Bottom Between the Bubbling Zones*, Lebedeva et al., 1979, pp. 268–270.

R. D. Argent *Colour Cell—A New Glass Colour Change Technology*, Glass International, Mar. 1987.

R. D. Argent *The Color Cell; Versatile Alternative for Forehearth Coloring*, Ceramic Industry, Apr. 1987, pp. 48–50.

R. D. Argent, *A New Glass Color Technology Is Introduced*, Glass Industry, Nov. 1987, pp. 18–24, 28.

*Glass Container Production Becomes More Flexible*, Ceramic Bulletin, vol. 67, No. 11, 1988, pp. 1748–1749.

R. D. Argent, *Colour Cell For High Volume Production of Green, Amber, and Clear Containers*, Glass Technology, vol. 30, No. 1, Feb. 1989, pp. 9–10.

Primary Examiner—Donald E. Czaja
Assistant Examiner—Steven P. Griffin
Attorney, Agent, or Firm—Alan G. Towner; Eckert Seamans Cherin & Mellott

[57] ABSTRACT

A method and apparatus for the production of colored glass includes the steps of diverting a stream of clear molten glass from at least one glass melting furnace through one or more transport channels to a color treatment chamber. Recycled cullet and color additive are added to a charging end of the treatment chamber. The treatment chamber is heated to melt the cullet and further heat the remaining feedstock to form a molten bath of colored glass which is thermally and chemically homogenized in the treatment chamber. Refractory rotary paddle wheels positioned in the transport channels regulate the flow rate and level of the molten glass and provide for selective shut off of individual glass streams. A glass level sensor is located in an outlet channel of the treatment chamber and is electrically coupled to a programmable controller to selectively regulate the rotational speed of the paddle wheels responsive to glass level fluctuations to maintain a controlled gob weight of colored glass supplied to the glass forming machine.

16 Claims, 5 Drawing Sheets

U.S. PATENT DOCUMENTS

| | | | |
|---|---|---|---|
| 2,817,191 | 12/1957 | Hamilton | 65/146 |
| 2,871,000 | 1/1959 | Dowling | 259/4 |
| 2,926,458 | 3/1960 | Lauck | 65/146 |
| 2,955,384 | 10/1960 | Silverman | 65/146 |
| 2,990,438 | 6/1961 | Lambert et al. | 13/6 |
| 3,024,121 | 3/1962 | Hagedorn | 65/145 |
| 3,057,175 | 10/1962 | Rough et al. | 65/346 |
| 3,185,554 | 5/1965 | Sweo et al. | 65/17 |
| 3,216,812 | 11/1965 | Silverman | 65/179 |
| 3,244,493 | 4/1966 | Cala | 65/346 |
| 3,261,677 | 7/1966 | Plumat | 65/346 |
| 3,294,512 | 12/1966 | Penberthy | 65/178 |
| 3,305,340 | 2/1967 | Atkeson | 65/134 |
| 3,330,638 | 7/1967 | Brown | 65/134 |
| 3,343,935 | 9/1967 | Keefer et al. | 65/145 |
| 3,352,659 | 11/1967 | Rahe | 65/134 |
| 3,359,090 | 12/1967 | Hynd | 65/178 |
| 3,414,396 | 12/1968 | Brichard | 65/134 |
| 3,417,186 | 12/1968 | Bllumenfeld | 65/134 |
| 3,445,216 | 5/1969 | Keefer et al. | 65/145 |
| 3,463,627 | 8/1969 | Le Blanc | 65/134 |
| 3,476,538 | 11/1969 | Trethewex | 65/162 |
| 3,523,779 | 8/1970 | Keshari et al. | 65/134 |
| 3,634,588 | 1/1972 | Steitz et al. | 65/325 |
| 3,663,245 | 5/1972 | Bryson | 106/52 |
| 3,676,099 | 7/1972 | Fultz | 65/162 |
| 3,723,084 | 3/1973 | Colchagoff | 65/136 |
| 3,779,731 | 12/1973 | Pollock et al. | 65/29 |
| 3,798,018 | 3/1974 | Peridon et al. | 65/134 |
| 3,856,496 | 12/1974 | Nesbitt et al. | 65/346 |
| 3,942,968 | 3/1976 | Pieper | 65/335 |
| 4,004,902 | 1/1977 | Peiper | 65/335 |
| 4,007,027 | 2/1977 | Froberg | 65/335 |
| 4,011,070 | 3/1977 | Hynd | 65/29 |
| 4,029,488 | 6/1977 | Rhett . | |
| 4,029,489 | 6/1977 | Froberg et al. . | |
| 4,069,032 | 1/1978 | Brax | 65/347 |
| 4,083,711 | 4/1978 | Jensen . | |
| 4,246,433 | 1/1981 | Seifried et al. . | |
| 4,277,274 | 7/1981 | Chrisman | 65/29 |
| 4,278,460 | 7/1981 | Chrisman et al. | 65/134 |
| 4,287,380 | 9/1981 | Fairbanks et al. . | |
| 4,347,072 | 8/1982 | Nagaoka et al. | 65/347 |
| 4,372,770 | 2/1983 | Krumwiede et al. | 65/134 |
| 4,429,402 | 1/1984 | Carley . | |
| 4,478,628 | 10/1984 | Dunn | 65/29 |
| 4,539,034 | 9/1985 | Hanneken | 65/134 |
| 4,601,743 | 7/1986 | Canfield | 65/162 |
| 4,737,917 | 4/1988 | Perron | 364/473 |
| 4,764,198 | 8/1988 | Lythgoe | 65/339 |
| 4,816,056 | 3/1989 | Tsai et al. | 65/135 |
| 4,819,247 | 4/1989 | Seng et al. . | |
| 4,862,477 | 8/1989 | Olds et al. . | |
| 4,897,103 | 1/1990 | Weilacher | 65/346 |
| 4,909,823 | 3/1990 | Bolin | 65/265 |
| 4,921,521 | 5/1990 | Kremenets | 65/135 |
| 4,961,772 | 10/1990 | Duly et al. | 65/134 |
| 5,006,145 | 4/1991 | Brinker | 65/135.3 |
| 5,055,122 | 10/1991 | Okumura et al. | 65/29 |
| 5,123,942 | 6/1992 | Argent et al. | 65/27 |

PROCESS AND APPARATUS FOR COLORING GLASS

CROSS-REFERENCE TO RELATED APPLICATIONS

This application is a continuation-in-part application of Ser. No. 07/981,854, filed Nov. 24, 1992, now abandoned of Ronald Douglas Argent and James A. Bolin.

BACKGROUND OF THE INVENTION

The present invention relates generally to the manufacture of glass and, more particularly, to the high volume production of glass containers wherein both colored glass and clear glass shapes may be produced simultaneously.

Heretofore, it has been common to either dedicate an entire glass melting furnace to the production of colored glass or to treat clear glass produced by a melting furnace by adding a color concentrate upstream of the glass forming machine in a forehearth region. Such known forehearth coloring technology has several shortcomings, the more notable being the limitation on glass throughput; the high raw material cost of color concentrates; as well as the high maintenance costs and associated downtime of the mechanical color stirrers. In addition, certain color additions requiring longer dwell times or higher melting temperatures, such as that required for producing amber colored glass, for example, cannot be produced by the forehearth coloring technique.

In prior attempts to increase throughput and production flexibility of colored glass, it has been proposed to utilize a so-called "color cell". The prior color cell employed a vertical flow-through refractory structure which diverted clear glass flow from a melting furnace. Color concentrates were added along with colored cullet (recycled glass) and melted in an electrically heated zone within the color cell. Mechanical stirrers were situated in a discharge portion of this prior arrangement in order to achieve homogeneous color and temperature. Energy costs as well as raw material costs were relatively high in this prior color treatment process, while production rates were concurrently low, on the order of about three tons per day.

The present invention solves many of the problems of the prior art by providing a process and apparatus for the simultaneous production of clear and colored glass at production throughput rates of up to 250 tons of glass per day. The present invention utilizes high levels of colored cullet and coloring agents in raw material form to provide greater plant throughput, while achieving significant material cost reduction and increased cullet usage than heretofore possible.

The present invention further provides a system in which the existing glass melting furnaces in a glass plant supply molten glass to the apparatus of the invention. In this manner, the existing melting furnaces realize a longer refractory life and operate at lower fuel consumption levels by producing clear glass only.

Still further, the glass coloring system of the present invention melts the cullet outside of the existing clear glass melting furnaces to increase production capacity for the entire facility while providing rapid color changes with a minimum of downtime. Clear glass production proceeds simultaneously with or in place of colored glass production or during color changeover periods.

The present invention, in addition, provides a method and apparatus for mixing, treating and homogenizing clear molten glass with preheated or cold cullet and raw material coloring agents which produces colored glass of superior quality, high throughput rates and at a low cost relative to known coloring systems.

The present invention further relates to apparatus and methods for controlling the flow of molten glass in a channel, and more particularly, to an apparatus and a method for controlling the flow of molten glass in a treatment chamber, a channel supplying glass to an inlet of a chamber and a channel receiving glass from an outlet of the chamber.

In apparatus for producing glassware articles, glass is melted in a furnace which delivers the molten glass via a channel or forehearth to a glassware forming machine. Gobs of molten glass are removed from the channel and are formed by the glassware forming machine into glassware articles. The apparatus is arranged such that the level of molten glass in the channel and furnace determines the weight of the article. In many applications, it is somewhat critical that the weight of the glassware articles produced by the glassware forming machine does not vary from one article to another. Thus, it is important to maintain a consistent level of molten glass in the apparatus so that glassware articles having consistent weights are produced.

The present invention, in this regard, further provides an apparatus and method for controlling the volumetric flow of molten glass in a channel to a color treatment chamber so as to produce glassware articles having consistent weights.

SUMMARY OF THE INVENTION

Briefly stated, the present invention encompasses methods and apparatus for the production of colored glass. A presently preferred method of the invention includes the steps of diverting a stream of clear molten glass from at least one large capacity glass melting furnace and introducing the stream into a refractory lined, color treatment chamber. A refractory lined channel transports the molten glass stream from the glass melting furnace to an inlet in the color treatment chamber. Cold or preheated cullet of a selected color is added to a charging end of the treatment chamber adjacent to the clear glass inlet. A coloring agent, preferably in raw material form, is added in selected amounts along with the cullet.

The interior of the treatment chamber is heated to melt the cullet while the cullet, clear glass and raw material coloring agent are stirred and homogenized in a mixing zone of the treatment chamber. Gas bubblers and submerged electrical heating elements may be placed in the treatment chamber to further mix and homogenize the bath. The colored glass exits the treatment chamber preferably by way of a horizontally extending throat and an inclined upflow riser. A bypass channel may be provided at the top of the riser for sampling of the treated glass prior to glass forming to permit clear glass production to continue on the designated colored glass forming machine until the proper color is obtained, whereupon the refractory gate or other valve means is opened and colored glass is directed to one or more glass forming machines. Simultaneously, clear glass may be directed from the large capacity glass melting furnace or furnaces to a plurality of glass forming machines for the production of clear shapes.

In a preferred mode of operation, streams of molten clear glass are directed to the color treatment chamber from two glass melting furnaces by way of two transport channels.

The cullet, hot glass and color additive enter the treatment chamber under controlled volumetric and temperature conditions. A controlled amount of clear glass in accordance with the respective flow rates of each hot glass stream is charged into the treatment chamber. The charging means for the cullet and color additive is preferably linked by programmable controllers to a glass level control means to achieve optimum steady state process control.

In accordance with the invention, hot clear glass is directed from one or more glass melting furnaces to the color treatment chamber of the invention while, simultaneously, clear glass shapes are being produced from such furnaces. Colored glass production, likewise, proceeds simultaneously on one or more glass forming machines being fed by the color treatment chamber from feedstock which includes hot clear glass, hot or cold colored cullet and a raw material color additive.

The present invention further includes molten glass flow control means comprising a refractory paddle wheel located adjacent the inlet of the color treatment chamber within each of the glass transport channels. The paddle wheel has a shaft located along an axis generally transverse to the flow of molten glass in the channel and includes a plurality of vanes extending from the shaft and into the molten glass for abetting the flow of molten glass in the channel. A variable speed drive means rotates the shaft of the paddle wheel at selected speeds. A sensor, located adjacent the outlet of the color treatment chamber, senses the level of glass at an outlet of the chamber. A sensor-responsive control, signals the drive means such that when the sensor detects an increase in the level of molten glass above a predetermined level, the control slows the drive means to decrease the flow of molten glass flowing from the transport channel into the color treatment chamber. Conversely, when the sensor detects a decrease in the level of molten glass below a predetermined level, the control accelerates the drive means to increase the flow of molten glass flowing from the transport channel into the treatment chamber.

The invention also involves a method for controlling the flow of molten glass in the treatment chamber, inlet channel and outlet channel including the steps of: abetting the flow of molten glass in the channel with means for selectively regulating the flow of molten glass flowing from the channel into the furnace; sensing the level of glass at the outlet of the furnace; and controlling the means for regulating the flow of molten glass such that the flow of molten glass flowing from the channel into the furnace decreases upon sensing an increase in the level of molten glass above a predetermined level and increases upon sensing a decrease in the level of molten glass below a predetermined level.

These, as well as other objects and advantages of the present invention, will become apparent when reference is made to the appended drawings taken with the accompanying detailed description wherein like reference numerals indicate like elements throughout the various views.

DESCRIPTION OF THE PREFERRED EMBODIMENTS

Figure 1:
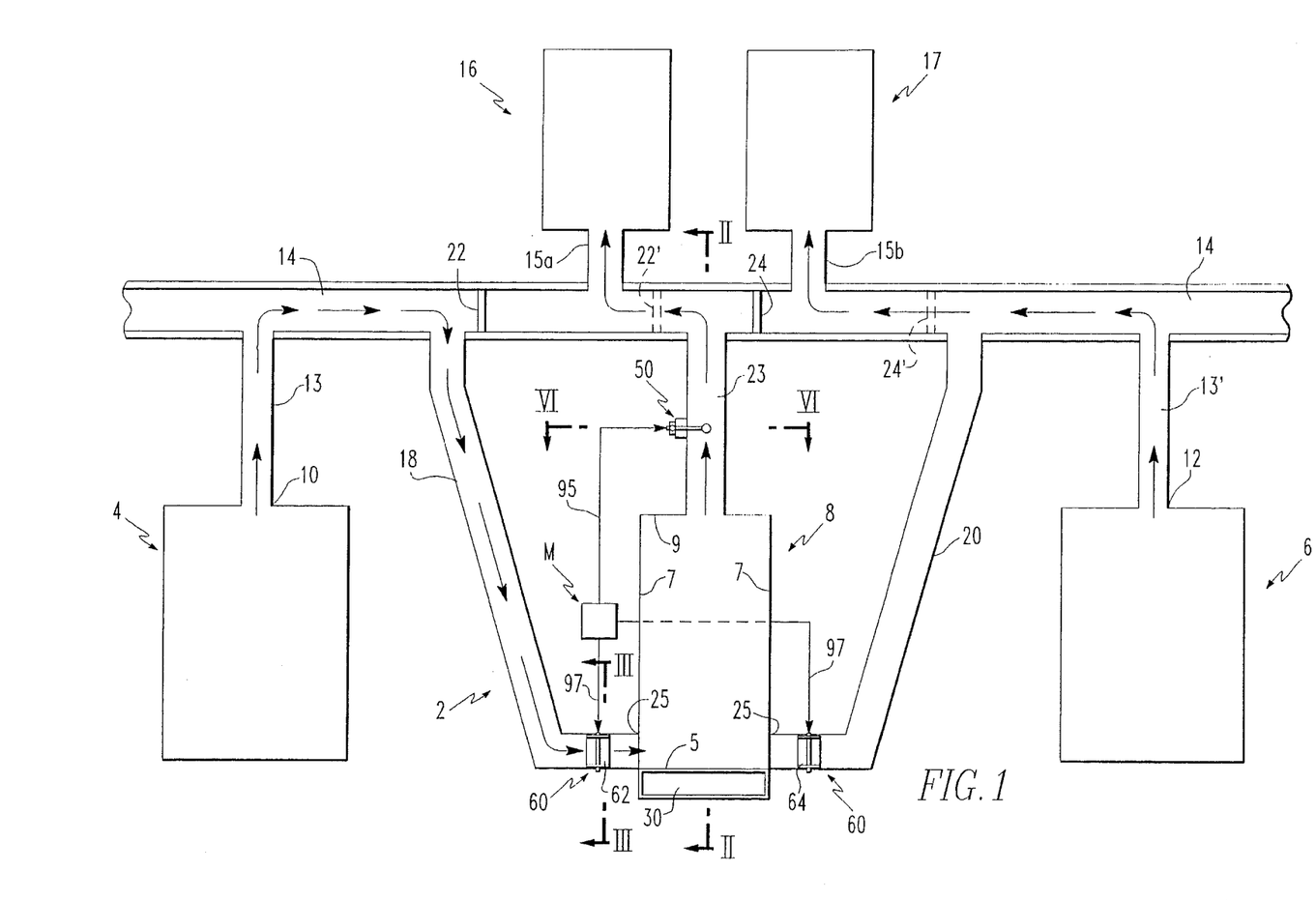
FIG. 1 is a schematic, plan view of the apparatus of the invention in operation with two glass melting furnaces.

Referring to the drawings, FIG. 1 is a schematic plan view of the invention generally designated 2, shown in use with two conventional, large capacity primary glass melting furnaces 4 and 6. A color treatment chamber 8 of the invention is situated between the glass melting furnaces 4 and 6. The glass melting furnaces 4 and 6 preferably produce clear molten glass which exits the respective melting furnaces at outlets 10 and 12 via channels 13, 13' to a so-called alcove or primary glass distribution channel 14, which is common to both melting furnaces. A plurality of secondary glass distribution channels 15a and 15b, referred to also as forehearths, communicate with the alcove or primary glass distribution channel 14 to carry molten glass to conventional feeders for glassware forming machines 16 and 17 for the production of glassware articles, such as bottles or jars, for example. Molten glass is supplied from the forehearths 15a, 15b to a conventional feeder bowl (not shown) from which the molten glass is fed in discrete charges or "gobs" into the respective glassware forming machines 16 and 17. The gobs of glass must be carefully controlled so that the glass shapes produced have consistent weights. In order to obtain consistently correct gob weights of glass, the level of molten glass in the channels 13 and 14 and forehearths 15a and 15b must be maintained at a predetermined level.

A pair of molten glass transport channels 18 and 20 communicate at respective first ends with the primary distribution channel 14 and at respective second ends with the color treatment chamber 8. The glass transport channels 18 and 20 carry molten glass, preferably clear glass, to a charging end 5 of the treatment chamber 8 for entry into the chamber 8 through inlets 25. Flow preventer gates in the form of refractory plates 22 and 24 are removably positioned in the primary distribution channel 14 to selectively divert respective streams to a given forehearth or to the color treatment chamber. Hot glass may be directed, for example, from the furnaces 4 and 6 through the respective transport channels 18 and 20 to the treatment chamber 8. As depicted in FIG. 1, forehearth 15a may be selectively blocked from receiving clear glass from the melting furnace 4 by virtue of the positioning of the flow preventer gate 22. Likewise, flow preventer gate 24 as positioned in FIG. 1 permits clear glass from furnace 6 to proceed directly to the forehearth 15b for the production of clear glass shapes on forming machine 17 while the clear glass from furnace 4 is directed to the color treatment chamber 8.

Use of the removable flow preventer gates 22 and 24 provides flexibility in running clear and/or colored glass to one or more of the plurality of glassware forming machines. For example, the forehearth 15b and glassware forming machine 17 may be converted from colored glass to clear glass simply by repositioning flow preventer gate 24 to the position 24' shown by phantom lines in FIG. 1 of the drawings. Likewise, forming machine 16 may be converted to clear glass production by repositioning flow preventer gate 22 to position 22'.

The color treatment chamber 8 is refractory lined and is generally rectangular in plan view, having opposed elongated walls 7 joined by a wall at the aforesaid charging end 5 and by a wall at an outlet end 9, with an enclosing floor 27 and roof 19. A reciprocating blanket type charger apparatus 30 is situated at an opening in the charging end 5 for the introduction of recycled glass cullet and color additive into the chamber 8, as will be explained in greater detail hereinafter. The chamber 8 further includes a glass containment region 11, FIG. 2, for thermally treating and homogenizing the bath of molten colored glass.

Figure 2:
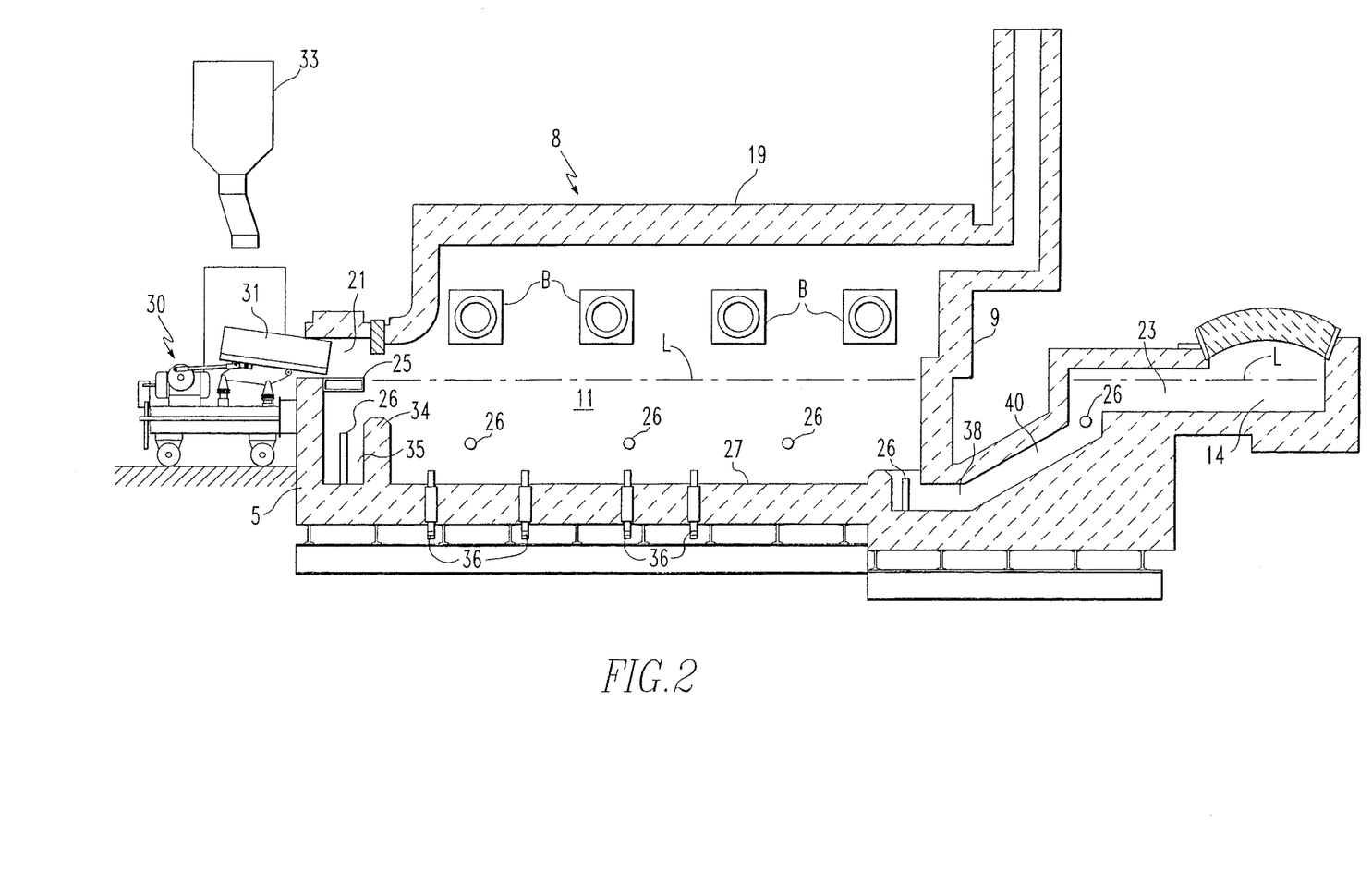
FIG. 2 is a partial, cross-sectional, side elevational view of a color treatment chamber of the invention taken along line II—II of FIG. 1.

With reference to FIGS. 1 and 2, hot clear glass from glass melting furnace 4 flows through the glass transport channel 18 to enter the treatment chamber 8 through an inlet 25 in a side wall 7 of the chamber. A color additive, preferably in raw material form, is introduced with a recycled cullet of the same color for feeding by way of the charger 30. Well-known coloring agents in raw material form, such as, for example, iron chromite, chromic oxide, or chromium trioxide may be utilized to produce a green colored glass; cobalt oxides may be used to produce a blue glass; and carbon-sulfur compounds may be employed to produce an amber color, for example.

The color treatment chamber 8 is primarily heated by a combustion heating system comprising a plurality of cross-firing, regenerative burners "B" firing above the molten glass surface "L". Preferably, the heating system is a low $NO_x$ or a no $NO_x$ system utilizing conventional regenerative burners or oxy-gas firing or a combination of any existing known technology. Secondary heat is applied to the treatment chamber 8 by a plurality of spaced apart molybdenum electrodes 26 submerged in the molten glass.

Still referring to FIG. 2, the charging end 5 of the color treatment chamber 8 includes an open "dog house" region 21 above the rear end wall to permit the charging of cullet and color additive by way of the blanket charger 30. Blanket chargers of this type are well-known in the glass industry for charging raw batch and cullet to glass melting furnaces. The blanket charger 30 includes a reciprocating charger plate 31 positioned across the open dog house region for depositing the cullet and color additive supplied from a hopper 33 onto the surface "L" of the molten bath of glass. The cullet and color additive charge enters the treatment chamber 8 at charging end 5 along with the clear molten glass which is introduced through the aforementioned inlets 25. These feedstock materials then move from a charging region 35 over the weir 34 into the containment region 11 of the treatment chamber 8 wherein the feedstock undergoes heating and homogenization.

A plurality of bubbler pipes 36 may be positioned along the floor 27 of the containment region 11 to define a mixing zone in the color treatment chamber 8. Pressurized air or other gas may be introduced through the pipes 36 to develop a controlled pulse bubbling action in the molten glass bath so as to impart a stirring and blending action within the bath of molten colored glass. The pulsed bubbling in the mixing zone moves the lower portion of the glass toward the surface "L". The electric heating or "boosting" provided by the submerged electrodes 26 located in the containment region 11 also causes thermally induced, convective stirring of the glass bath. This stirring action of the molten bath of colored glass results in both a chemical and thermal homogenization of the feedstock materials. The stirring movement also improves the heat transfer from above the glass surface so as to create a more uniform temperature profile in the bath. The treated glass gradually moves toward the outlet end 9 of the treatment chamber 8 and becomes more homogenized both in color and in temperature as it traverses the length of the treatment chamber. Glass temperatures of between about 2300°–2350° F. are typical within chamber 8.

The homogenized, molten colored glass exits the color treatment chamber 8 by way of a horizontal throat 38 and inclined, upflow riser 40 located at outlet end 9 of the chamber. A glass sampler bypass channel (not shown) may be situated downstream of the outlet riser to permit quality control glass sampling to take place. A glass outlet channel 23 extends between and communicates with the inclined riser 40 of the treatment chamber 8 and the alcove or primary distribution channel 14 and forehearth region. A plate type flow preventer or other valve means (not shown) is preferably positioned in the glass outlet channel 23 to prevent the flow of colored glass from the chamber 8 until the sampling is completed and the quality of the colored glass is satisfactory prior to commencing a production run. During the colored glass sampling procedure, clear glass production preferably continues on the glass forming machines. When colored glass production is to commence, the flow preventer plate is removed to permit hot colored glass flow to the distribution channel 14. The colored glass then flows to the forehearth 15a to the glass forming machine 16 communicating therewith for the production of colored glassware articles. A typical color treatment chamber 8 can produce, by way of example, 240 tons of hot, emerald green glass per day, employing 190 tons of hot, clear glass from furnace 4 and 50 tons of cold green recycled cullet combined with raw iron chromite color additive introduced by the charger 30.

The glass flow path from the furnaces 4 and 6 to the color treatment chamber 8 and outlet channel 23 represents a considerable distance which results in a substantial head loss through the system. As will be explained in greater detail hereinafter, a glass level sensor 50 is positioned in the outlet channel 23 to monitor the glass level at that location. The level sensor 50 provides a signal which is employed to control glass head loss compensators generally designated 60 in FIG. 1. The head loss compensators 60 function as impellers or pumps to move the molten glass. The head loss compensators 60 are preferably in the form of rotatable, refractory paddle wheels 62 and 64.

The pair of rotatable refractory paddle wheels 62, 64 are located adjacent each inlet 25 of the treatment chamber 8 within transport channels 18 and 20, respectively to abet the flow of molten glass from the channels into the chamber 8 to compensate for the head loss from the melting furnaces 4 and 6 and to provide a uniform gob weight for feeding the forming machines 16 and 17. The paddle wheels 62, 64 of the presently preferred embodiment are capable of rotating between 0.5 and 3.5 RPM. During operation of the furnaces 4 and 6 and glassware forming machines 16 and 17, the paddle wheels typically rotate between 2.0 and 3.0 RPM. Since the construction of each paddle wheel 62, 64 is identical, a description of one will suffice for both.

Figure 3:
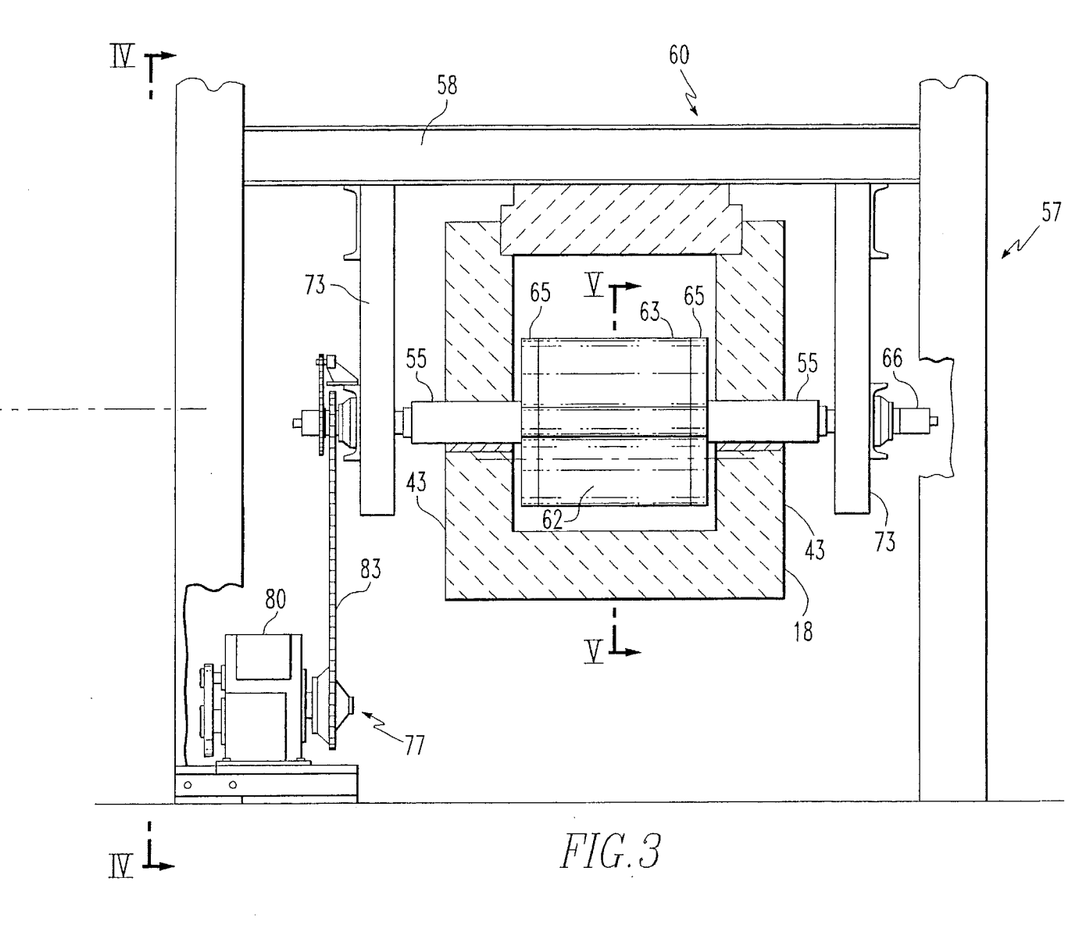
FIG. 3 is a partially fragmented, cross-sectional, end view of a transport channel and paddle wheel apparatus taken along line III—III of FIG. 1.
Figure 4:
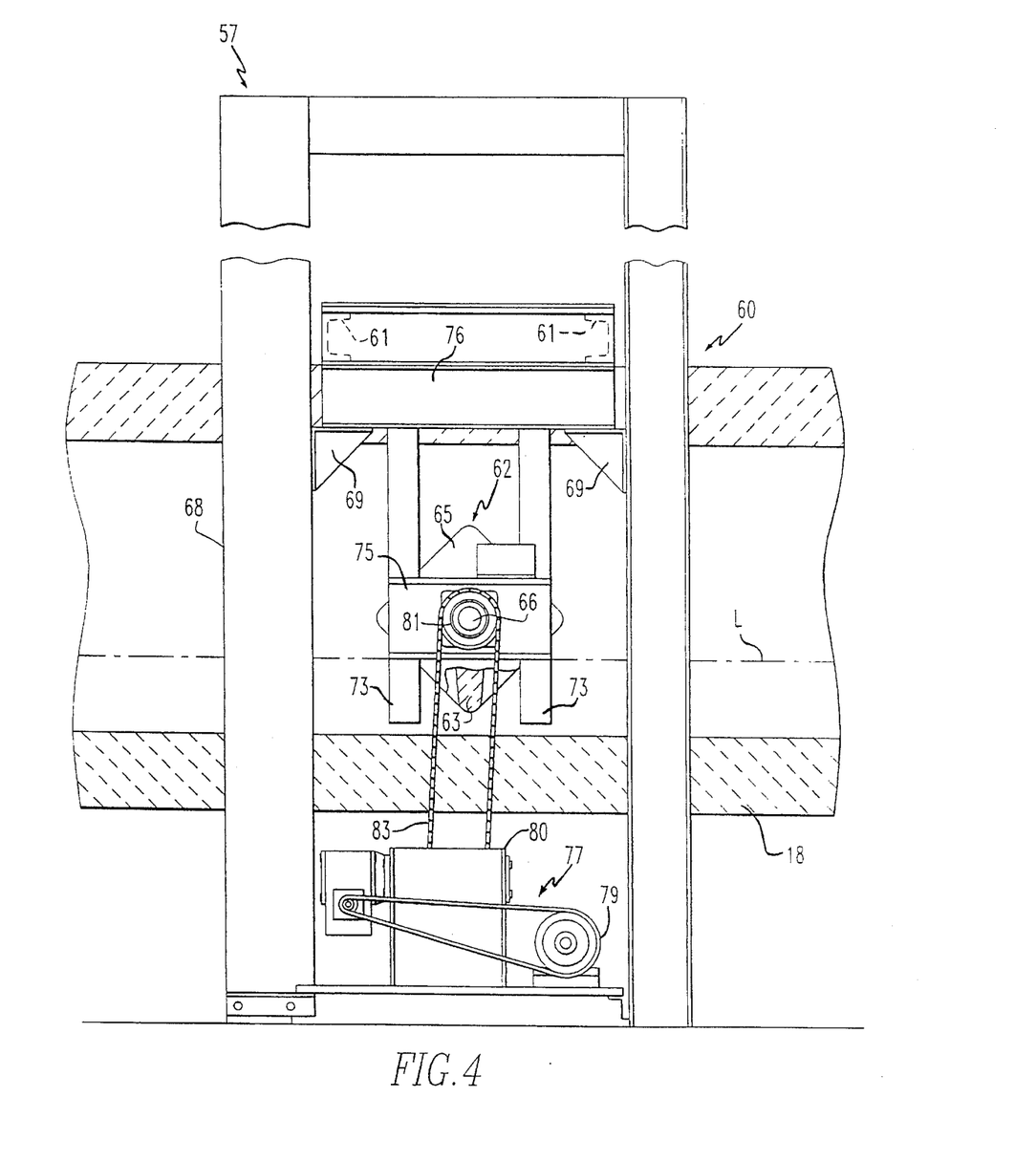
FIG. 4 is a partially fragmented, cross-sectional, side elevation view of the transport channel and paddle wheel apparatus taken along line IV—IV of FIG. 3.
Figure 5:
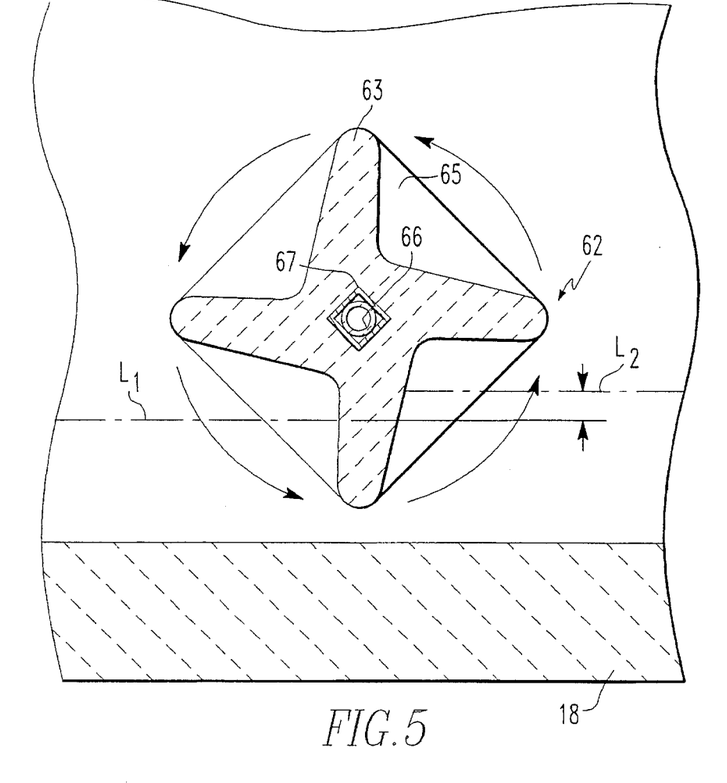
FIG. 5 is an enlarged, cross-sectional, side elevation view of the paddle wheel apparatus taken along line V—V of FIG. 3.

As shown in FIGS. 3–5, the paddle wheel 62 is mounted on a fluid-cooled shaft 66 located along a horizontal axis generally transverse to the flow of molten glass in the channel 18. The shaft 66 is hollow, as seen in FIG. 5, and is constructed so that cooling fluid, preferably water, enters one end of the shaft at one of the side walls 43 of the channel 18 and exits through the other end of the shaft at the other side wall 43. Means (not shown) is provided for supplying the cooling fluid at the one end of the shaft 66 and for retrieving and recirculating the fluid at the other end of the shaft.

The paddle wheel 62 has four radially extending vanes 63 formed integrally with end walls 65 and is constructed from a dense refractory ceramic material. As illustrated in FIG. 5, the paddle wheel has a unitary construction. The vanes 63 of the paddle wheel are supported at an elevation which allows them to successively enter the molten glass as the paddle wheel is rotated. A drive shaft 67 having a square cross section, shown in FIG. 5, contains the shaft 66. The paddle wheel 62 has a square opening axially formed therethrough to receive the square shaft 67 therein. When rotated, the square shaft 67 imparts positive, rotative movement to the paddle wheel by virtue of the square configuration. As shown in FIG. 5, the rotating vanes 63 of paddle wheel 62 cause the glass level in the channel 18 to increase from level $L_1$ to $L_2$ to compensate for the head loss due to the long travel path from furnace 4. This is, of course, also true for the paddle wheel 64 located in the channel 20.

An opening is provided in each side wall 43 of the channel 18 for receiving a refractory sleeve 55 positioned at each laterally opposite end of the shaft 66. Each end of the shaft 66 of the paddle wheel 62 is journaled in the sleeve 55 mounted in the side wall 43 of the channel. The sleeves 55 are sealingly engaged with the side walls 43 to prevent molten glass from flowing between the openings in the side walls and the sleeves. The refractory side walls 43 of the channel are constructed so that the paddle wheel shaft 66 is built into the side walls 43 during their construction. As such, the side walls 43 are adapted to be torn down for removing and replacing the paddle wheel 62.

Each end of the shaft 66 is supported by a frame which is generally indicated by reference numeral 57. As shown in FIG. 3, the frame 57 includes left- and right-hand supports which are located outboard of respective side walls 43 of the channel 18 and are interconnected by crossbeams 58 as depicted in FIG. 3. As shown in FIG. 4, the frame 57 also includes two vertical posts 68 of I-beam construction and a pair of first horizontal beams 61 attached to the posts by welding, for example. Two support brackets 69 support a second beam 76. The support brackets 69 may be welded to their respective posts 68 and the second beam 76 may be welded at its ends to the brackets. The second beam 76 has a pair of vertical hangers 73 attached thereto by welding. The hangers 73 in turn support a third beam 75 having an opening formed therein to receive the paddle wheel 62. The third beam 75 is bolted to the hangers 73. A bearing (not shown) is fitted in the opening (or mounted to the beam 75 over the opening) for supporting the left end of the shaft 66. FIG. 3 illustrates the shaft being supported at each of its ends by the said third beam 75. The third beam 75 and shaft mounted paddle wheel 62 are vertically adjustable along the hangers 73 by virtue of elongated slots formed in the hangers (not shown) which permit the bolted coupling site between the beam 75 and hangers 73 to be selectively moved. In this manner, the immersion depth of the paddle wheel vanes 63 into the molten glass may be altered if desired.

For each paddle wheel 62, 64, the shaft 66 is chain-driven by a variable-speed drive, generally designated 77. As seen in FIGS. 3 and 4, the drive 77 includes a motor 79 which drives a gear box 80. The left end of the shaft 66 has a sprocket 81 mounted thereon which is driven by the gear box 80 via chain 83. As noted above, the drive 77 is a variable-speed drive and thus is capable of driving the shaft 66 of the paddle wheel 62 at selected speeds. It will be noted that the round shaft 66 is welded or otherwise fixed to the outer square shaft 67 to permit the rotation of square shaft 67 and paddle wheel 62 when the inner round shaft 66 is driven.

In order to increase the amount of molten glass delivered to the inlet 25 of the treatment chamber 8, the speed of the motor 79 is increased. Conversely, to decrease the amount of molten glass delivered to the treatment chamber 8, the speed of the motor 79 is decreased. A microprocessor M (FIG. 1) controls the speed of the motor 79 which in turn controls the speed of the paddle wheels 62, 64. The microprocessor M may also be coupled to the drive motor of the charger 30 to selectively increase or decrease the amount of cullet and color additive being fed into the color treatment chamber 8.

The paddle wheels 62, 64 also function effectively as back flow preventers to prevent the reverse flow of colored glass to the alcove or channel 14 which would otherwise contaminate the clear glass stream and render it unfit for clear glassware manufacture.

As mentioned above, the level of molten glass in the primary distribution channel 14 and treatment chamber 8 determines the weight of the gob of glass being delivered to the glassware forming machine. It is critical that the level of molten glass be set at a predetermined set point level "L" so that glassware articles having consistent weights are produced. A glass level sensor, generally indicated by reference numeral 50, is located downstream from the outlet of the color treatment chamber 8 in the outlet channel 23 to sense the level of molten glass adjacent the outlet of the chamber 8, as schematically depicted in FIG. 1.

Figure 6:
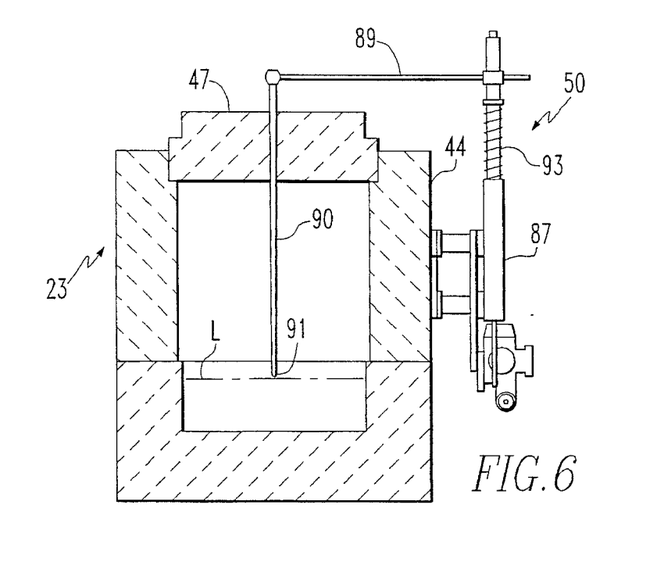
FIG. 6 is a cross-sectional, end view of a glass level sensor aspect of the invention taken along line VI—VI of FIG. 1.

With reference to FIG. 6, the glass level sensor 50 comprises a support structure 87 mounted on one of the side walls 44 of the outlet channel 23. A support arm 89 extends laterally from the support structure 87 in a direction over an enclosed top 47 of the channel 23. A probe 90 carrying a sensing tip 91 extends downwardly from the support arm 89 through an opening in the top 47 of the channel and into the cavity of the channel 23. The sensing tip 91 of the probe 90 is calibrated to establish a set point equivalent to a desired, predetermined level "L" of molten glass for producing glassware articles having a consistent, specified weight. The probe 90 is sensitive to level changes as small as ¹⁄₁₀₀₀th inch. The support structure 87 has a telescoping member 93 which is rotated relative to the main body of the support structure to increase or decrease the elevation of the arm 89. Hence, the elevation of the tip 91 of the probe 90 is varied by rotation of the telescoping member 93. An electric motor (not shown) is provided for cyclically raising and lowering the arm 89 and probe 90. In operation, the probe 90 is raised and lowered automatically in a pulsed manner at regular time intervals of, for example, every 30 seconds. The tip 91 of the probe measures the glass level when the tip makes contact with the glass surface as the probe 90 is lowered. The sensor 50 is a commercially available item and may be of the type sold by BH-F (System), Inc. of Maumee, Ohio under the trademark "Series 2030 Glass Level Control Systems".

Thus, it will be understood that the sensor 50 is employed to detect the level of molten glass at regular time intervals in the outlet channel 23 at glass levels above or below the predetermined set point level "L". When the level of molten glass in the channel increases above the predetermined set point level "L", a signal is sent via electrical signal line 95 (FIG. 1) from the sensor 50 to the microprocessor M. The microprocessor in turn sends a signal to one or both of the motors 79 of the paddle wheels 62, 64 via electrical signal lines 97 to decrease the speed of the paddle wheels and thus decrease the flow of molten glass flowing from one or both of the channels 18, 20 into the color treatment chamber 8. In a similar manner, when the sensor 50 detects that the level of molten glass in the channel 23 has fallen below the predetermined set point level "L"., the microprocessor M directs the motors 79 to accelerate for increasing the speed of one or both of the paddle wheels. This, in turn, increases the flow of molten glass flowing from the channels 18 and/or 20 into the color treatment chamber 8.

It is also within the scope of the invention to rotate one of the paddle wheels at a constant RPM, for example, at 3.0 RPM, while controlling the RPM of the other paddle wheel in a variable manner with the microprocessor M and level sensor 50. In this manner, both paddle wheels compensate for the head loss between the furnaces 4, 6 and the treatment chamber 8 while the single paddle wheel, variably controlled by the microprocessor, regulates the glass level at the outlet channel.

When producing glassware articles, the microprocessor M and sensor 50 are programmed such that the probe 90 of the sensor 50 detects fluctuations of the molten glass level in the outlet channel at regular intervals of for example every 20 or 30 seconds. Depending upon whether a decrease or increase of level is detected, the speed of one or both of the paddle wheels 62, 64 is adjusted accordingly. Typically, the microprocessor M is programmed to vary the speed of the paddle wheels for a decrease or increase of molten glass in the channel as small as 1/100th of an inch. It has been determined that a paddle wheel speed of about 3.0 RPM is suitable under steady state conditions in order to compensate for a two inch head loss from the furnaces 4 and 6 to the treatment chamber 8.

It will be readily apparent to those skilled in the art that the color treatment chamber 8 of the present invention provides additional plant versatility in the manufacture of colored glass. The treatment chamber 8 is adapted to receive hot clear glass or hot colored glass from one, two or three or more furnaces. In the embodiment shown in FIG. 1, treatment chamber 8 receives clear molten glass from the large capacity primary melting furnace 4 while the other primary melting furnace 6 is simultaneously producing clear glass shapes on forming machine 17 via forehearth 15b. In accordance with the invention, feedstocks of various shades of the same color may be introduced in chamber 8 and treated to achieve a desired color value. In addition, the recycled cullet material which is introduced into the treatment chamber by charger 30 may, likewise, be colored or clear. The cullet may be preheated or cold. Thus, cullet or molten glass of a lighter or darker color value than the end product may be charged into the chamber 8 wherein the proper color value is obtained by balancing the amounts of color additive introduced and/or colored cullet charges.

The color treatment chamber 8 permits the production of all glass colors employing color additives in raw material form which necessarily lowers the cost of the feedstock materials. Colors such as amber, which heretofore could not be produced in a typical forehearth coloring system are easily made in the treatment chamber of the present invention. Use of the color treatment chamber 8 also permits rapid color changes while not interfering with ongoing production of clear glass from the furnaces 4 and 6.

It is preferred in most situations to maintain the glass melting furnaces 4 and 6 in clear glass production so as to increase the furnace refractory life and lower the furnace fuel consumption. This type of furnace utilization naturally increases glass output from a given furnace since the downtime required for convention color changeover is eliminated. Furthermore, with the use of the color treatment chamber 8, it is possible to utilize additional cullet feedstock which provides additional melt capacity for the entire glass factory, thus increasing total glass output. It will be understood that the invention permits the use of recycled colored cullet in large quantities and a variety of cullet color values which otherwise could not be accomplished using conventional glass manufacturing techniques.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. Apparatus for coloring glass in the manufacture of glassware articles comprising:

at least one transport channel adapted to receive molten glass from a glass melting furnace;

a color treatment chamber having a floor, a charging end and an outlet end, joined by opposed side walls enclosed by a roof and defining a horizontally extending glass containment region therein, said chamber further having an inlet formed therein for receiving molten glass from said at least one transport channel;

means for abetting a flow of molten glass in said at least one transport channel;

charger means at a charger end of said color treatment chamber for introducing cullet and a color additive into the said containment region in said color treatment chamber;

heater means associated with said color treatment chamber to melt said cullet supplied to said containment region of said color treatment chamber and to further heat the molten glass and color additive to form a molten bath of colored glass in said containment region;

means associated with said containment region of said color treatment chamber for homogenizing the color and temperature of the molten bath of colored glass in said containment region; and a distribution channel positioned and arranged at said outlet end of said color treatment chamber communicating with said containment region of said color treatment chamber for delivery of said molten colored glass to at least one remotely located glassware forming machine and positioned and arranged at an outlet of said glass melting furnace and at an inlet of said at least one transport channel to receive molten glass from said glass melting furnace and to supply said molten glass from said glass melting furnace to said at least one transport channel and to said at least one remotely located glassware forming machine, the means for abetting a flow of molten glass in said at least one transport channel comprising a paddle wheel rotatably mounted in said at least one transport channel, a varible speed drive means operatively connected with said paddle wheel for rotating said paddle wheel, said paddle wheel having a plurality of radially extending vanes for engagement with molten glass in said at least one transport channel, and a sensor and control means for determining a level of glass in said distribution channel and for regulating said variable speed drive means to selectively increase or decrease the speed of rotation of said paddle wheel in response to a predetermined glass level.

2. The apparatus of claim 1 wherein said paddle wheel is formed from a refractory ceramic material.

3. The apparatus of claim 2 wherein said paddle wheel is mounted for rotation on a hollow shaft and wherein said hollow shaft is adapted to receive a liquid coolant therethrough.

4. The apparatus of claim 1 including two of said transport channels, each transport channel adapted to receive molten clear glass from a separate glass melting furnace and wherein the distribution channel has a plurality of gate means selectively positioned therein to direct said colored glass stream from said color treatment chamber to a first selected glassware forming machine and to direct a clear glass stream from one of said glass melting furnaces to one of said two transport channels for delivery to said color treatment chamber and to direct a clear glass stream from another of said glass melting furnaces to a second selected glass forming machine.

5. The apparatus of claim 4 wherein said plurality of gate means comprises of refractory plate removably positioned in the distribution channel and configured to block off the flow of molten glass therein.

6. The apparatus of claim 1 wherein said heater means associated with said color treatment chamber includes a plurality of cross-fired regenerative burners having a low $NO_x$ ouput.

7. The apparatus of claim 1 wherein said color treatment chamber has a horizontally extending throat communicating with said outlet end of said color treatment chamber and a vertically inclined riser communicating with said horizontally extending throat and with said distribution channel.

8. The apparatus of claim 1 wherein said means for homogenizing includes means for introducing air bubbles into the molten bath of colored glass in said containment region.

9. The apparatus of claim 1 wherein said means for homogenizing includes electrical heater means submerged in said molten bath of colored glass in said containment region to cause thermally induced convective stirring movement of said molten bath.

10. A process for making colored glassware articles comprising:

providing two glass melting furnaces for making clear glass;

providing a color treatment chamber;

providing a stream of molten clear glass from at least one of said two glass melting furnaces to said color treatment chamber;

providing means in said stream of molten clear glass for selectively abetting the flow of said stream;

introducing molten clear glass from said stream into said color treatment chamber;

charging cullet and color additive to said color treatment chamber to form a mixture of cullet, color additive and molten clear glass therein;

heating said mixture in said color treatment chamber to form a molten bath of colored glass;

moving said molten bath within said color treatment chamber to homogenize the color and temperature of said bath of molten colored glass;

transferring said colored glass from said color treatment chamber to at least one glass forming machine for producing colored glassware articles;

providing glass level sensing and control means for sensing a level of the colored glass in said transferring step and for regulating a speed of the flow abetting means to introduce a regulated flow of said molten clear glass into said color treatment chamber to maintain a desired level of colored glass in said transferring step, whereby colored glassware articles having consistent weights are produced.

11. The process of claim 10 wherein said flow abetting means is a rotatable refractory paddle wheel.

12. A process for producing colored glass comprising;

providing a color treatment chamber;

providing at least on molten glass stream from at least one glass melting furnace;

providing means in said at least one molten glass stream for selectively abetting a flow of said at least one molten glass stream comprising a rotatable paddle wheel positioned in the at least one molten glass stream and control means for regulating the rotational speed of said paddle wheel;

introducing molten glass from said at least one molten glass stream to said color treatment chamber;

introducing cullet and a color additive to said color treatment chamber to form a mixture of cullet, molten glass and color additive;

heating said mixture in said color treatment chamber to form a molten bath of colored glass;

moving said molten bath within said color treatment chamber to homogenize the color and temperature of said bath of molten colored glass; and transferring said molten colored glass from said color treatment chamber to at least one glass forming machine for producing colored glass shapes.

13. The process of claim 12 wherein at least two molten glass streams from at least two glass melting furnaces provide clear, hot glass to said color treatment chamber.

14. The process of claim 13 wherein said control means includes glass level sensing means for sensing a level of the molten colored glass in said transferring step and for regulating the rotational speed of said paddle wheel responsive to the sensed glass level to maintain a consistent gob weight of molten colored glass charged to the at least one glass forming machine.

15. The process of claim 12 wherein said heating step includes heating by a cross-fired, regenerative burner system having a low $NO_x$ output.

16. The process of claim 12 wherein said step of moving the molten bath of colored glass comprises at least one of bubbling a gas through said bath or heating said bath with a plurality of electrical heaters submerged in the bath.

* * * * *

UNITED STATES PATENT AND TRADEMARK OFFICE
CERTIFICATE OF CORRECTION

PATENT NO.  : 5,588,978
DATED       : December 31, 1996
INVENTOR(S) : Argent et al.

It is certified that error appears in the above-indentified patent and that said Letters Patent is hereby corrected as shown below:

Claim 1, column 10, line 17, "to" should be -- for --.

Claim 1, column 10, line 17, "receive" should be -- receiving --.

Claim 12, column 12, line 17, "on" should be -- one --.

Signed and Sealed this

Ninth Day of December, 1997

*Attest:*

*Attesting Officer*

BRUCE LEHMAN

*Commissioner of Patents and Trademarks*